United States Patent
Lee et al.

(10) Patent No.: US 8,933,674 B2
(45) Date of Patent: Jan. 13, 2015

(54) SWITCH CONTROLLER, SWITCH CONTROL METHOD, AND POWER SUPPLY DEVICE COMPRISING THE SWITCH CONTROLLER

(71) Applicant: Fairchild Korea Semiconductor Ltd., Kyungki-do (KR)

(72) Inventors: Young-Je Lee, Bucheon (KR); Gye-Hyun Cho, Incheon (KR); Jae-Yong Lee, Seongnam (KR); Ji-Hoon Jang, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 240 days.

(21) Appl. No.: 13/677,834

(22) Filed: Nov. 15, 2012

(65) Prior Publication Data
US 2013/0128640 A1     May 23, 2013

(30) Foreign Application Priority Data
Nov. 23, 2011  (KR) .................... 10-2011-0123163

(51) Int. Cl.
| H02M 3/156 | (2006.01) |
| H02M 7/12 | (2006.01) |
| G05F 3/02 | (2006.01) |
| H02M 7/217 | (2006.01) |

(52) U.S. Cl.
CPC . *H02M 7/12* (2013.01); *G05F 3/02* (2013.01); *H02M 7/217* (2013.01)
USPC .............................. 323/222; 363/89; 323/284

(58) Field of Classification Search
USPC ....................... 323/222, 22, 282, 284; 363/89
See application file for complete search history.

(56) References Cited

U.S. PATENT DOCUMENTS

| 7,777,740 B2 * | 8/2010 | Lee ............................... 345/420 |
| 7,834,606 B2 * | 11/2010 | Liu et al. ....................... 323/283 |
| 2008/0218133 A1 * | 9/2008 | Kuan ............................ 323/234 |

* cited by examiner

*Primary Examiner* — Gary L Laxton
(74) *Attorney, Agent, or Firm* — Okamoto & Benedicto LLP

(57) ABSTRACT

The present invention relates to a switch controller, a switch control method, and a power supply including the switch controller. An exemplary embodiment of the present invention detects an on-time of a power switch of the power supply and decreases a frequency of a clock signal according to a period during which the detected on-time is shorter than or equal to the minimum on-time. According to the exemplary embodiment, switching of the power switch is controlled according to a clock signal, and the minimum on-time is an on period of the power switch that cannot be shortened.

31 Claims, 10 Drawing Sheets

SWITCH CONTROLLER, SWITCH CONTROL METHOD, AND POWER SUPPLY DEVICE COMPRISING THE SWITCH CONTROLLER

CROSS-REFERENCE TO RELATED APPLICATION

This application claims priority to and the benefit of Korean Patent Application No. 10-2011-0123163 filed in the Korean Intellectual Property Office on Nov. 23, 2011, the entire contents of which are incorporated herein by reference.

BACKGROUND OF THE INVENTION (a) Field of the Invention

The present invention relates to a switch controller controlling switching operation, a switch control method, and a power supply including the switch controller.

(b) Description of the Related Art

FIG. 1 shows a power supply using a buck converter. In FIG. 1, a load of the power supply is illustrated as an LED string formed of a plurality of LEDs. In FIG. 1, a rectifying bride is realized as a bridge diode 1.

As shown in FIG. 1, AC power is rectified through the bridge diode 1 in the LED light emission diode. The bridge diode 1 full-wave rectifies the input AC power. A rectified voltage, that is, an input voltage is supplied to an inductor 2, and the inductor 2 supplies a driving current to the LED string according to operation of a switch S. A switching unit 3 including the power switch S controls switching operation of the power switch S.

When the power switch S is in the turn-on state, an LED current flowing to the LED string is increased, and when the power switch S is in the turn-off state, the LED current is decreased. When the input voltage is a sine wave and the power switch S is peak-controlled, a duty of the power switch S is controlled to be inversely proportional to the input voltage. In addition, the duty of the power switch S is proportional to a load.

FIG. 2 shows an input voltage, a duty, and an LED current of the power supply in an ideal case.

As shown in FIG. 2, the duty is controlled to be inversely proportional to the input voltage, and the LED current is changed in accordance with the input voltage. However, a duty and an LED current in an actual case are different from the duty and the LED current of FIG. 2.

FIG. 3 shows an input voltage, a duty, and an LED current of the power supply in an actual case.

In the actual case, the duty cannot be shorter than the minimum on-time due to a leading edge blanking period and a propagation delay. Thus, when the input voltage exceeds a predetermined threshold value as shown in FIG. 3, the duty is maintained constantly, that is, maintained with the minimum on-time.

Then, the LED current may be distorted rather than being a sine wave like the input voltage as shown in FIG. 3. Then, the power factor is decreased and the total harmony distortion (THD) is increased.

The distortion of the LED current causes an overcurrent, and the overcurrent may causes damage to an element. That is, the overcurrent flows to the LED string so that the LED element may be damaged.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to prevent deterioration of a power factor and increase of THD due to the minimum on-time. Also, the present invention is provided to prevent damage to an external element due to overcurrent.

A switch controller according to an exemplary embodiment of the present invention controls switching operation of a power switch. The switch controller includes a control means detecting an on-time of the power switch and decreasing a frequency of a clock signal according to a period during which the detected on-time is shorter than or equal to the minimum on-time and a switching control unit controlling switching of the power switch according to the clock signal. The minimum on-time is an on period of the turn-on power switch and cannot be shortened.

The control means includes: an on-time detector detecting the on-time using a switching control signal for switching control, generated from the switching control unit; a frequency controller controlling frequency decrease of a clock signal according to a period during which the detected on-time is shorter than or equal to the minimum on-time; and an oscillator generating the clock signal according to control of the frequency controller.

The on-time detector generates a ramp voltage corresponding to the on-time using the switching control signal and generates a detection signal according to a result of comparison between a threshold voltage corresponding to the minimum on-time and the ramp voltage.

The on-time detector includes: a switching transistor performing switching according to the switching control signal; a capacitor including a first terminal connected to a first terminal of the switching transistor; a constant current source connected to the first terminal of the capacitor; and a comparator including a first input terminal connected to the capacitor and a second input terminal to which the threshold voltage is input, and outputting a result of comparison between the two inputs. A voltage charged in the capacitor is the ramp voltage.

The on-time detector further includes an inverter inverting the switching control signal and outputting the inverse signal, and an output of the inverter is input to a gate electrode of the switching transistor.

The frequency controller counts a period during which the detected on-time is shorter than or equal to the minimum on-time, and decreases the frequency of the clock signal when the counting result reaches a predetermined threshold period.

After decreasing of the frequency of the clock signal, the frequency controller decreases the decreased frequency of the clock signal again when a counting result of the period during which the detected on-time is shorter than or equal to the minimum on-time reaches the threshold period again.

The frequency controller includes: a counter counting a period during which the ramp voltage is lower than the threshold voltage by sensing the detection signal for each switching period of the power switch according to the switching control signal, and generating a first decrease signal indicating whether the counting result reaches the threshold period; a first SR latch generating a first frequency control signal according to the first decrease signal; a second SR latch generating a second decrease signal according to the first decrease signal after a predetermined delay period; a delay unit maintaining the second SR latch to be reset during the delay period after frequency decrease of the clock signal; and a first logical operation unit generating a second frequency control signal by performing a logical operation on the second decrease signal and the first frequency control signal.

The counter includes n D-flipflops, each including an input terminal, an output terminal, an inverse output terminal, and a clock signal to which a signal corresponding to the switching control signal is input and a second logical operation unit. An input terminal of one of the n D-flipflops is connected to an output terminal of another D-flipflop disposed in the previous stage, an output terminal of the D-flipflop is connected to an input terminal of another D-flip-flop disposed in the next stage of the D-flipflop, and the detection signal is input to an input terminal of the D-flipflop of the first terminal among the n D-flip-flops.

The second logical operation unit generates the first decrease signal by performing logical operation on n inverse output signals output through the respective inverse output terminals of the n D-flopflops, and n is determined according to the threshold period.

When the n D-flipflops output n low-level inverse output signals, the first SR latch generates an enable-level first frequency control signal that decreases a frequency of the clock signal according to the first decrease signal.

The second logical operation unit is an NOR gate and the signal corresponding to the switching control signal is an inverse signal of the switching control signal.

The delay unit includes m T-flipflops, each including a reset terminal to which the first frequency control signal, a clock signal, an input terminal, and an inverse output terminal connected to the input terminal, a third logical operation unit, and an D-flip-flop.

An inverse output terminal of one T-flipflop among the m T-flip-flops is connected to a clock terminal of another T-flip-flop disposed in the next stage, and the clock signal is input to a clock terminal of the T-flipflop of the first terminal among the m T-flip-flops.

The third logical operation performs logical operation on m inverse output signals output through the respective inverse output terminals of the m T-flipflops, the D-flip-flop generates a reset signal that terminates the delay period according to an output of the third logical operation unit, and m is determined according to the delay period.

When the m T-flipflops output m low-level inverse output signals, the D-flipflop generates the reset signal. The third logical operation unit is an NOR gate, an output of the third logical operation unit is input to the clock terminal of the D-flipflop, a high-level signal is input to the input terminal of the D-flipflip, and the reset signal is an inverse output of the D-flip-flop.

The oscillator control the frequency of the clock signal in generation of the clock signal according to the first and second frequency control signals.

The oscillator includes: a variable synch current source generating a variable synch current that varies according to the first and second frequency control signals; a sawtooth wave generator generating a charging current and a discharging current by mirroring the variable synch current and generating a sawtooth wave by controlling the charging and discharging currents according to the clock signal; and a clock signal generator generating the clock signal according to a result of comparison between sawtooth wave and highest and lowest references.

The variable synch current includes: a first synch current source connected with the sawtooth wave generator at a node; a first control switch including a first terminal connected to the node, and being switched according to the first frequency control signal; a second control switch including a first terminal connected to the node, and being switched according to a second frequency control signal; a second synch current source connected to a second terminal of the first control switch; and a third synch current source connected to a second terminal of the second control switch.

The sawtooth wave generator includes: a first current mirror circuit generating the charging current by mirroring the variable synch current; a second current mirror circuit being turned on/off according to the clock signal and generating the discharging current by mirroring the mirrored variable synch current; and a capacitor charged by the charging current and discharged by a difference between the discharging current and the charging current.

The first current mirror circuit includes a first transistor through which the variable synch current flows and being diode-connected and a second transistor including a gate electrode connected to a gate electrode of the first transistor, and the second current mirror circuit includes a third transistor through which the mirrored variable synch current flows and being diode-connected and a fourth transistor including a gate electrode connected to a gate electrode of the third transistor and a first electrode connected to a first electrode of the second transistor.

The sawtooth wave generator further includes a first electrode connected to gate electrodes of the third and fourth transistors, a gate electrode to which the clock signal is input, and a second electrode being grounded, and the capacitor is connected between a node at which the second transistor and the fourth transistor are connected with each other and the ground.

The clock signal generator includes: a highest value comparator receiving the sawtooth wave and the highest reference and generating an output according to a result of comparison between the two inputs; a lowest value comparator receiving the sawtooth wave and the lowest reference and generating an output according to a result of comparison between the two inputs; and an SR latch decreasing the clock signal according to the output of the highest value comparator and increasing the clock signal according to the output of the lowest value comparator.

A method for controlling switching operation of a power switch according to another exemplary embodiment of the present invention includes detecting an on-time of the power switch and decreasing a switching frequency of the power switch according to a period during which the detected on-time is shorter than or equal to the minimum on-time. The minimum on-time is an on period of the power switch and cannot be shortened.

The detecting of the on-time includes generating a ramp voltage corresponding to the on-time using a switching control signal generated in the controlling of the switching and detecting the on-time according to a result of comparison between a threshold voltage corresponding to the minimum on-time and the ramp voltage.

The decreasing of the switching frequency includes decreasing a frequency of a clock signal in generation of the clock signal according to a period during which the detected on-time is shorter than or equal to the minimum on-time, and the switching frequency of the power switch depends on the frequency of the clock signal.

The decreasing of the frequency of the clock signal in generation of the clock signal includes: a first decrease step in which the period during which the detected on-time is shorter than or equal to the minimum on-time and the frequency of the clock signal is decreased when the counting result reaches a predetermined threshold period; and a second decrease step in which when a counting result of a period during which the detected on-time is shorter than or equal to the minimum on-time reaches the threshold period again after decreasing of the frequency of the clock signal, the decreased frequency of the clock signal is decreased again.

The decreasing of the frequency of the clock signal in generation of the clock signal further includes blocking decreasing the frequency of the clock signal again for a predetermined delay period after decreasing of the frequency of the clock signal.

A power supply according to another exemplary embodiment of the present invention includes: an inductor to which a full-wave rectifying voltage is input and a current depending on the full-wave rectifying voltage flows; a power switch connected to the inductor to control the inductor current; and a switch controller detecting an on-time of the power switch and decreasing a switching frequency of the power switch according to a period during which the detected on-time is shorter than or equal to the minimum on-time. The minimum on-time is an on period of the power switch and cannot be shortened.

The switch controller includes: an on-time detector detecting the on-time using a switching control signal controlling switching operation of the power switch; a frequency controller controlling frequency decrease of a clock signal according to a period during which the detected on-time is shorter than or equal to the minimum on-time; and an oscillator generating the clock signal according to control of the frequency controller.

The on-time detector generates a ramp voltage corresponding to the on-time using the switching control signal and generates a detection signal according to a result of comparison between a threshold voltage corresponding to the minimum on-time and the ramp voltage.

The frequency controller counts a period during which the detected on-time is shorter than or equal to the minimum on-time, generates a first frequency control signal decreasing a frequency of the clock signal when the counting result reaches a predetermined threshold period, and generates a second frequency control signal decreasing the decreased frequency of the clock signal again when a result of counting a period during which the detected on-time is shorter than or equal to the minimum on-time again after decreasing the frequency of the clock signal reaches the threshold period again.

The frequency controller prevents the frequency of the clock signal from being decreased again during a predetermined delay period after the frequency decrease of the clock signal.

The oscillator generates a variable synch current that varies according to the first and second frequency control signals, generates a charging current and a discharging current by mirroring the variable synch current, generating a sawtooth wave by controlling the charging and discharging currents according to the clock signal, and generating the clock signal according to a result of comparison between the sawtooth wave and highest and lowest references.

According to the exemplary embodiments of the present invention, a switch controller, a switch control method, and a power supply including the switch controller can be provided to prevent the power factor deterioration and THD increase due to the minimum on-time and damage to an external element due to overcurrent.

DETAILED DESCRIPTION OF THE EMBODIMENTS

Figure 1:
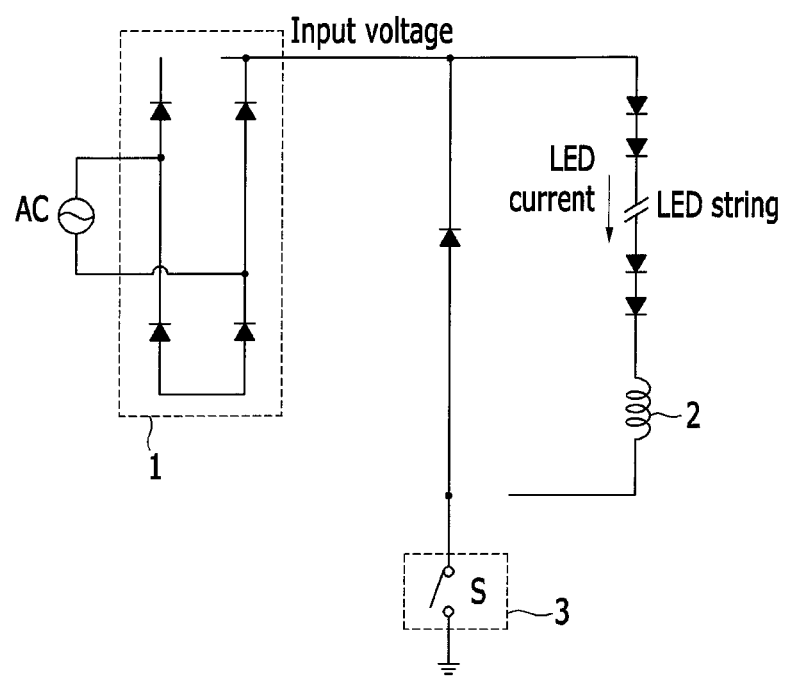
FIG. 1 shows a power supply using a buck converter.
Figure 2:
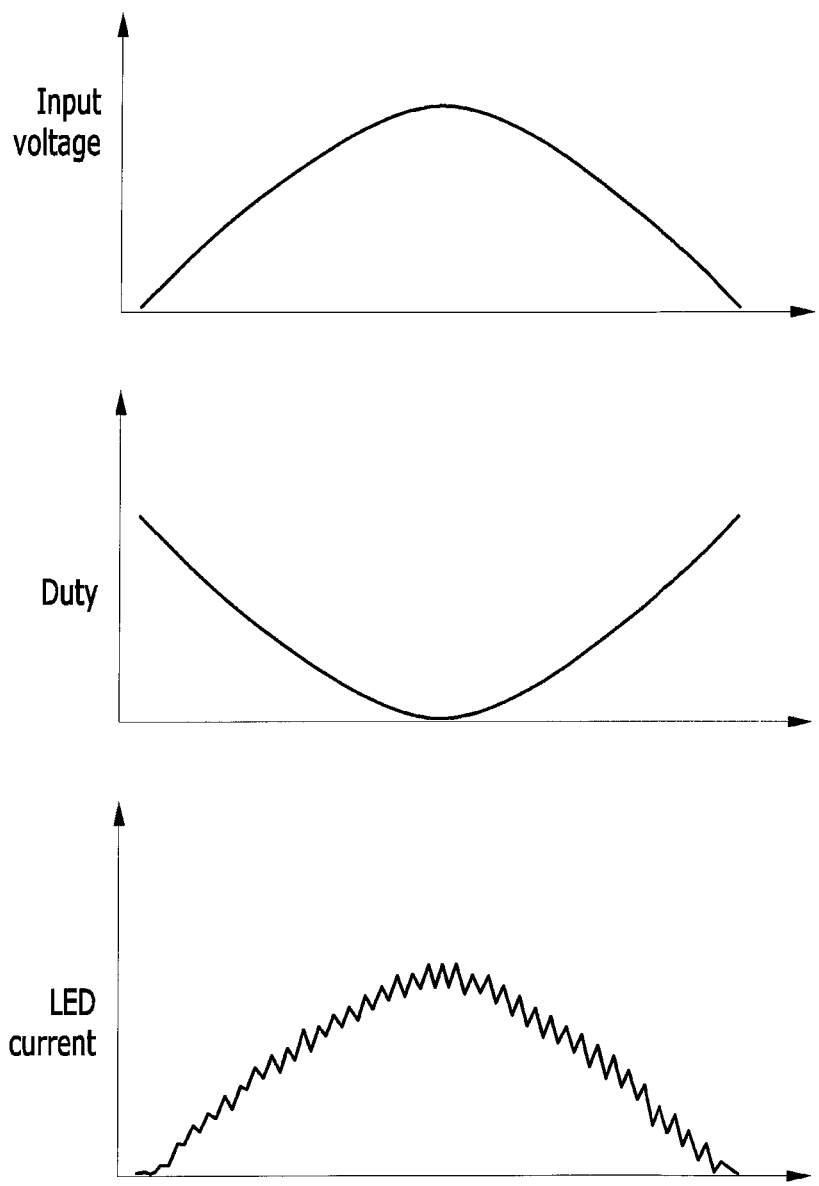
FIG. 2 shows an input voltage, a duty, and an LED current of a power supply in an ideal case.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. Throughout the specification, unless explicitly described to the contrary, the word "comprise" and variations such as "comprises" or "comprising" will be understood to imply the inclusion of stated elements but not the exclusion of any other elements.

Hereinafter, a switch controller, a power switch including the switch controller, and a switch control method according to an exemplary embodiment of the present invention will be described with reference to the accompanying drawings.

Figure 4:
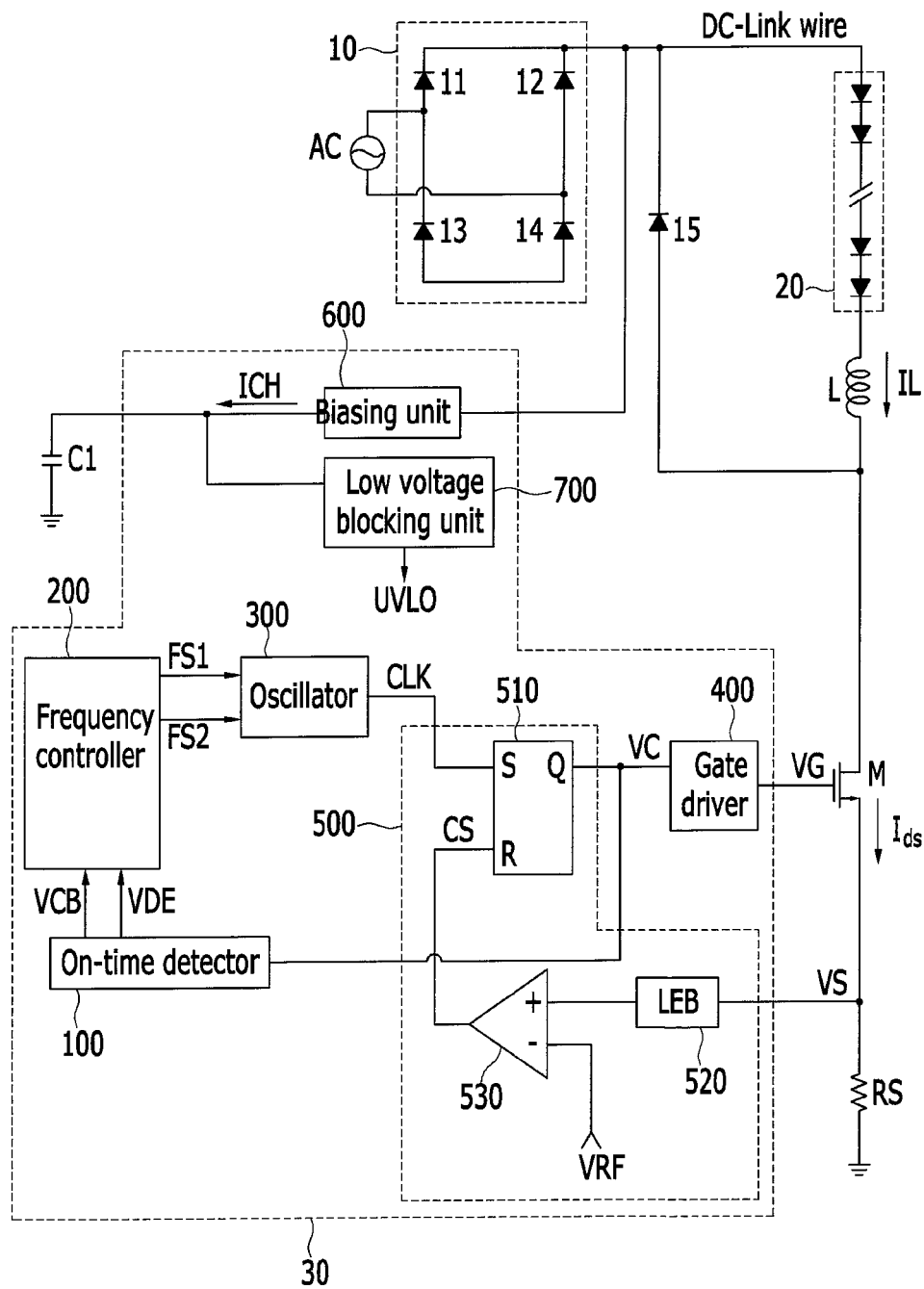
FIG. 4 shows a switch controller and a power supply including the same.

FIG. 4 shows a switch controller and a power supply including the switch controller according to an exemplary embodiment of the present invention. The power supply according to the exemplary embodiment of the present invention is realized as a buck converter, but the present invention is not limited thereto. A power supply 40 according to the exemplary embodiment of the present invention supplies power to an LED string 20 formed of a plurality of LED elements coupled in series.

As shown in FIG. 4, a power switch M performs switching operation according to a gate signal VG transmitted from a switch controller 30. The power switch M is realized as an n-channel metal oxide semiconductor filed effect transistor (NMOSFET). The exemplary embodiment of the present invention is not limited thereto, and the power switch M may be realized as another type of transistor.

The power supply 40 includes a power switch M, a bridge diode 10, diode 15, an inductor L, and a switch controller 30. The switch controller 30 and the power switch M may respectively formed of a single chip and the two configurations may be formed in one package.

The bridge diode 10 is formed of four diodes 11, 12, 13, and 14, and generates a full-wave rectification voltage Vrec by full-wave rectifying an input AC power source. The full-wave rectification voltage Vrec is transmitted to the LED string 20 through a DC-link wiring. The full-wave rectification voltage Vrec supplies a power source voltage for operation of the LED string 20.

The inductor L charges power using the full-wave rectification voltage Vrec according to the switching operation of the power switch M, and supplies the power to the LED string 20. A first terminal of the inductor L is connected to the LED string 20 and a second terminal of the inductor L is connected to the power switch M.

In further detail, while the power switch M is being turned-on, a current generated by the full-wave rectification voltage Vrec flows to the inductor L such that the power is charged, and while the power switch M is being turned off, the power charged in the inductor L is supplied to the LED string 20.

The diode 15 is a fast recovery diode, and includes an anode connected to the drain electrode of the power switch M and the second terminal of the inductor L and a cathode connected to the DC-link wiring. The diode 15 is conducted during the turn-off state of the power switch M, and thus an inductor current IL is transmitted to the LED string 20.

The power switch M controls output power supplied to a load, that is, the LED string 20 by controlling the inductor current IL. The power switch M includes the drain electrode connected to the second terminal of the inductor L, a source electrode connected to a first terminal of a sense resistor RS, and a gate electrode to which the gate signal VG transmitted from the switch controller 30 is input. The power switch M is switched by the gate signal VG.

The power switch M is turned on, and the inductor current IL flows through the LED string 20 and the power switch M. A current (hereinafter, referred to as a drain current Ids) flowing to the power switch M flows to the resistor RS such that a sense voltage VS is generated. According to the switching operation of the power switch M, a current rectified by the bridge diode 10 is supplied to the LED string 20. During the turn-on period of the power switch M, the inductor current IL flowing to the inductor L is generated and the LED string 20 emits light according to the inductor current IL.

The switch controller 30 detects an on-time of the power switch M, and decreases a switching frequency according to a period during which the detected on-time is shorter than or equal to the minimum on-time to thereby decrease a duty. The minimum on-time means an on period of the power switch M that cannot be shortened due to an LEB blanking period or a propagation delay period, and the duty means a ratio of an on-time with respect to one switching cycle.

Figure 3:
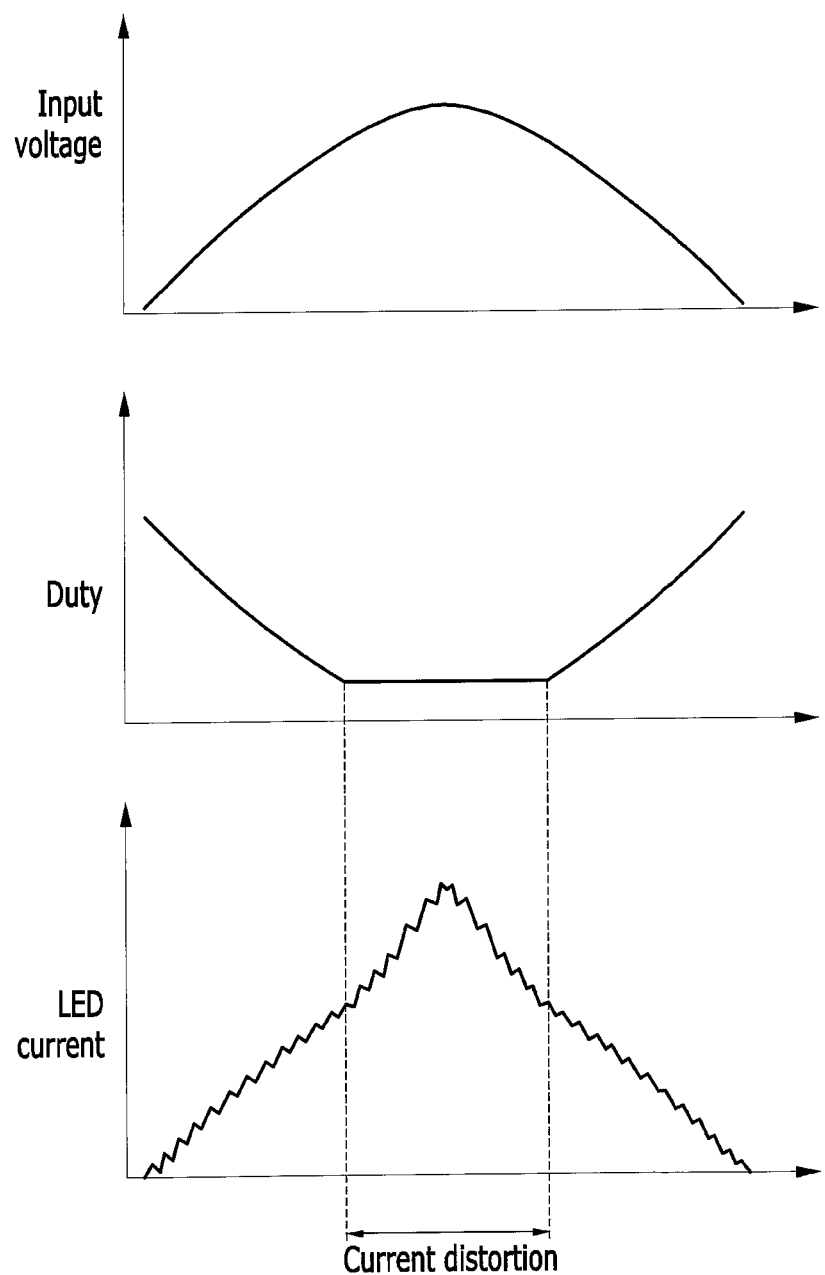
FIG. 3 shows an input voltage, a duty, and an LED current of the power supply in an actual case.

When switching operation is controlled with a fixed frequency as in a conventional method, the duty is not decreased to be lower than the minimum duty due to the minimum on-time. The minimum duty is a value acquired by dividing the minimum on-time with one current switching cycle (i.e., (minimum on-time)/(one current switching cycle)). In this case, when an input voltage is high or a load is low, the LED current according to the minimum duty is distorted rather than having a sine wave as shown in FIG. 3.

The switch controller 30 according to the exemplary embodiment decreases the minimum duty by decreasing the switching frequency in order to prevention distortion of the LED current due to the minimum on-time. Then, a period during which the LED current is decreased is increased compared to a period during which the LED current is increased, and accordingly the LED peak is decreased. Then, the current distortion shown in FIG. 3 may be suppressed.

As shown in FIG. 4, the switch controller 30 includes an on-time detector 100, a frequency controller 200, an oscillator 300, a gate driver 400, a switching control unit 500, a biasing unit 600, and a under voltage lockout 700.

The biasing unit 600 generates a power source voltage VCC by generating a charging current ICH that charges a capacitor C1 using the full-wave rectification voltage Vrec. The power source voltage VCC is a power source voltage for operation of the switch controller 30.

The under voltage lockout 700 locks out the power source voltage VCC when the power source voltage VCC is lower than a regulated voltage that is required for operation of the switch controller 30. When the switch controller 30 is activated, the under voltage lockout 700 generates a UVLO signal to lock out the power source voltage VCC from the switch controller 30 during a period during which the power source voltage VCC is lower than the regulated voltage.

The switching control unit 500 generates a gate control signal VC that determines a switching frequency and an on-time according to a clock signal and a drain current Ids. The switching control unit 500 includes an SR latch 510, a LEB 520, and a switching comparator 530.

The LEB 520 blocks a sense voltage VD during a predetermined blanking period in order to prevent the power switch M from being turned off by a peak current generated at the turn-on time of the power switch M.

The switching comparator 530 determines the on-time of the power switch M according to a result of comparison between an off reference voltage VRF and the sense voltage VS. The switching comparator 530 generates a high-level output when an input of a non-inversion terminal (+) is higher than an input of an inversion terminal (−), and generates a low-level output in the opposite case.

Since the off reference voltage VRF is input to the inversion terminal (−) of the switching comparator 530 and the sense voltage VS is input to the non-inversion terminal (+) of the switching comparator 530, a high-level comparison signal CS is generated when the sense voltage VS is higher than the off reference voltage VRF and a low-level comparison signal CS is generated when the sense voltage VS is lower than the off reference voltage VRF.

The SR latch 510 generates a gate control signal VC that turns on the power switch M according to an input of a set terminal S, and generates a gate control signal VC that turns off the power switch M according to an input of a reset terminal R. The generated gate signal VC is output through an output terminal Q.

The clock signal CLK is input to the set terminal S of the SR latch 510 and the comparison signal CS is input to the reset terminal R thereof. The SR latch 510 according to the exemplary embodiment generates a high-level gate control signal VC by being synchronized with a rising edge of the clock signal CLK and generates a low-level gate control signal VC by being synchronized with a rising edge of the comparison signal CS.

The gate driver 400 generates an enable-level gate signal VG that turns on the power switch M according to the high-level gate control signal VC, and generates a disable-level gate signal VG that turns off the power switch M according to the low-level gate control signal VC. Since the power switch M is an N channel type, the enable-level is high level and the disable-level is low-level.

The on-time detector 100 detects the on-time by using the gate control signal VC. The frequency controller 200 controls the decrease of the switching frequency according to a period during which the detected on-time is shorter than or equal to the minimum on-time. The oscillator 300 generates a clock signal having a frequency that depends on the control of the frequency controller 200.

Hereinafter, the on-time detector 100 according to the exemplary embodiment of the present invention will be described with reference to FIG. 5.

Figure 5:
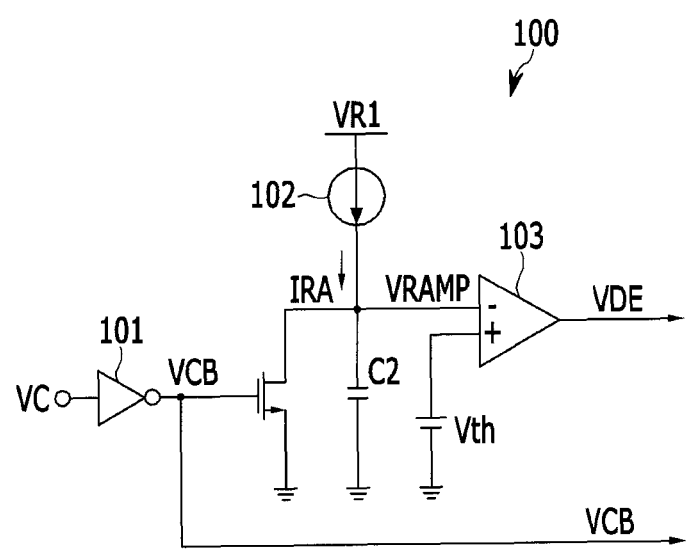
FIG. 5 shows an on-time detector according to an exemplary embodiment of the present invention.

FIG. 5 shows the on-time detector according to the exemplary embodiment of the present invention.

The on-time detector 100 generates a ramp voltage VRAMP that corresponds to the on-time using the gate control signal VC, and compares a threshold voltage Vth corresponding to the minimum on-time with the ramp voltage VRAMP. According to the comparison result, the on-time detector 100 can detect a period during which the on-time is shorter than or equal to the minimum on-time. The threshold voltage Vth is greater than an increasing ramp voltage for the minimum on-time, but it may be set to a value close to the increasing ramp voltage.

The on-time detector 100 includes an inverter 101, a constant current source 102, a comparator 103, a switching transistor 104, and a capacitor C2.

The inverter 101 inverts the phase of the gate control signal VC, and outputs a voltage according to the inversed phase. Hereinafter, the output of the inverter 100 is referred to as an inverse gate control signal VCB.

The switching transistor 104 includes a gate electrode connected to an output terminal of the inverter 101, a drain electrode connected to the constant current source 102, and a source electrode connected to the ground. The switching transistor 104 performs switching operation according to the inverse gate control signal VCB.

The constant current source 102 generates a constant current IRA using the voltage VR1. The constant current source 102 is connected to the capacitor C1. The switching transistor 104 is connected to the capacitor C1 in parallel.

When the switching transistor 104 is in the turn-on state, the constant current IRA flows to the ground. Thus, the capacitor C1 is not charged. When the switching transistor 104 is in the turn-off state, the constant current IRA charges the capacitor C1.

In the exemplary embodiment, when the gate control signal VC is in the enable level, the switching transistor 104 is turned off to increase the ramp voltage VRAMP, and when the gate control signal VC is in the disable level, the switching transistor 104 is turned on to decrease the ramp voltage VRAMP to the ground voltage.

The inverter 101 is used for the above-stated operation, but the present invention is not limited thereto. A buffer or a level shifter may be used instead of using the inverter 101 according to an enable level and a disable level of the gate control signal VC and the channel type of the switching transistor 104. In addition, the gate signal VG may be used instead of using the gate control signal VC. That is, a switching control signal (e.g., the gate control signal, the gate signal, and the like) generated for switching control of the power switch M in the switching control unit 500 may be input to the on-time detector 100.

The comparator 103 generates a detection signal VDE according to a result of comparison between the ramp voltage RAMP and the threshold voltage Vth. The comparator 103 generates a high-level detection signal VDE when an input of a non-inversion terminal (+) of the comparator 103 is higher than an input of an inversion terminal (−) thereof, and generates a low-level detection signal VDE in the opposite case.

The threshold voltage Vth is input to the non-inversion terminal (+) and the ramp voltage VRAMP is input to the inversion terminal (−) of the comparator 103. Thus, while the ramp voltage VRAMP is lower than or equal to the threshold voltage Vth, a high-level detection signal VDE is generated, and while the ramp voltage VRAMP is higher than the threshold voltage Vth, a low-level detection signal VDE is generated.

Hereinafter, the frequency controller 200 2 will be described with reference to FIG. 6.

Figure 6:
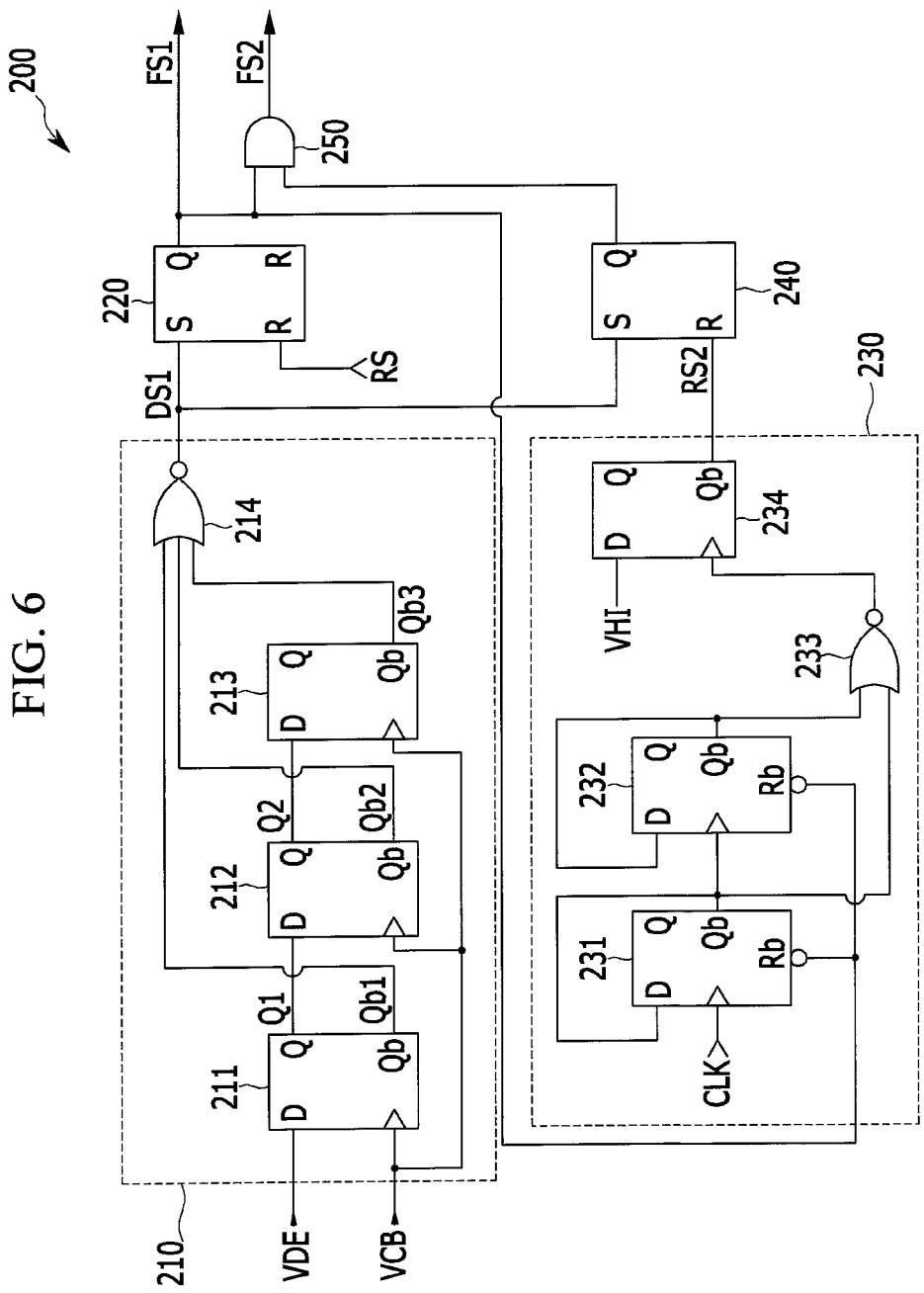
FIG. 6 shows a frequency controller according to the exemplary embodiment of the present invention.

FIG. 6 shows the frequency controller according to the exemplary embodiment of the present invention.

The frequency controller 200 counts a period during which the detected on-time is shorter than or equal to the minimum on-time, and when the counting result reaches a predetermined threshold period, the frequency controller 200 decreases the switching frequency. When the period during which the detected on-time is shorter than or equal to the minimum on-time is generated again after the decrease of the switching frequency, the frequency controller 200 re-counts the period during which the detected on-time is shorter than or equal to the minimum on-time, and the switching frequency is decreased again when the re-counting results reaches the threshold period.

That is, the frequency controller 200 can decrease the switching frequency whether the result of counting the period during which the detected on-time is shorter than or equal to the minimum on-time reaches the threshold period. In the exemplary embodiment, the switching frequency is decreased two times, but the present invention is not limited thereto.

The frequency controller 200 includes a counter 210, a first SR latch 220, a delay unit 230, a second SR latch 240, and a logical operation unit 250.

The counter 210 receives the detection signal VDE and the inverse gate control signal VCB, and counts a high-level period of the detection signal VDE for each switching cycle. That is, the counter 210 performs the counting for each period during which the ramp voltage VRAMP is lower than or equal to the threshold voltage Vth as the switching cycle. When the counted period reaches the threshold period, the counter 210 generates a first decrease signal DS1 instructing decrease of the switching frequency. Here, the first decrease signal has an enable level.

The count 210 includes three D-flip-flops 211 to 213 and a logical operation unit 214. The threshold period is set to two switching cycles and thus the counter 210 includes three D-flipflops, but the present invention is not limited thereto.

The detection signal VDE is input to an input terminal D of the D-flip-flop 211 and the inverse gate control signal VCB is input to a clock terminal thereof. The D-flip-flop 211 outputs an output signal Q1 depending on a logic level the input terminal D through an output terminal Q and outputs an output signal Qb1 having an inverse logic level of the input terminal D through an inverse output terminal Qb at a rising edge of a signal input to the clock signal.

The output signal Q1 of the D-flip-flop 211 is input to the input terminal D of the D-flip-flop 212 and the inverse gate control signal VCB is input to the clock terminal thereof. The D-flip-flop 212 outputs an output signal Q2 depending on a logic level of an input terminal D through an output terminal Q and outputs an output signal Qb2 having an inverse level of the input terminal D through an inverse output terminal Qb at a rising edge of a signal input to the clock terminal.

The output signal Q2 of the D-flip-flop 212 is input to an input terminal D of the D-flip-flop 213, and the inverse gate control signal VCB is input to a clock terminal. The D-flip-flop 213 outputs an output signal Qb3 having an inverse logic level of the input terminal D through an inverse output terminal Qb at a rising edge of a signal input to a clock signal.

Since the inverse gate control signal VC is respectively input to the clock terminals of the D-flip-flops 211 to 213, the D-flip-flops 211 to 213 generate the inverse output signals Qb1 to Qb3 by being synchronized with the rising edge of the inverse gate control signal VC. A cycle of the inverse gate control signal VC is the same as one switching cycle, and therefore the counter 210 can count the detection signal VDE for each switching cycle.

The logical operation unit 214 receives the inverse output signals Qb1 to Qb3 from the three D-flip-flops 211 to 213, and generates the first decrease signal DS1 having an enable level when the input signals are all in the low level. The enable level is a high level in the exemplary embodiment, and therefore the logical operation unit 214 may be realized as an NOR gate performing an NOR logical operation.

The first SR latch 220 generates a first control signal FS1 decreasing a switching frequency according to the first decrease signal DS1 having the enable level. The first SR latch 220 includes a set terminal S to which the first decrease signal DS1 is input and a reset terminal R to which a reset signal RS is input.

The first SR latch 220 generates a high-level first frequency control signal FS1 by being synchronized with a rising edge of the first decrease signal D1. The first SR latch 220 resets the first frequency control signal FS1 to a low level by being synchronized with a rising edge of the reset signal RS1. In the exemplary embodiment, the reset signal RS1 may be a UVLO signal.

The delay unit 230 controls secondary decrease of the switching frequency to be performed after a predetermined delay period from the primary decrease. The first decrease signal DS1 is input to a set terminal S of the second SR latch 240, and thus the second SR latch 240 may generate a second frequency control signal FS2 that decreases the switching frequency simultaneously with the primary decrease time point. In order to prevent this, the delay unit 230 controls the second SR latch 240 to be in the reset state for a delay period from the primary decrease time point.

The delay unit 230 includes two T-flip-flops 231 and 232, an NOR gate 233, and a D-flip-flop 234.

Each of the two T-flip-flops 231 and 232 includes an input terminal D, an output terminal Q, an inverse output terminal Qb, a reset terminal Rb, and a clock terminal. The input terminal D and the inverse output terminal Qb of each of the two T-flip-flops 231 and 232 is connected with each other, and the first frequency control signal FS1 is input to the reset terminal Rb.

A clock signal CLK is input to the clock terminal of the T-flip-flop 231, and an inverse output of the T-flipflop 231 is input to the clock terminal of the T-flip-flop 232.

When the high-level first frequency control signal FS1 that decreases the switching frequency is input to the reset terminal Rb, the T-flip-flop 231 and the T-flip-flop 232 terminate reset. In this case, the inverse output of each of the T-flip-flops 231 and 232 has a high level as in the reset state, and the input terminal D of each of the T-flip-flops 231 and 232 is also high level.

The T-flip-flop 231 generates a low-level inverse output having an inverse low level of the low level of the input terminal D and outputs the inverse output through the inverse output terminal Qb by being synchronized with a rising edge of the clock signal CLK. In this case, the input terminal D of the T-flip-flop 231 also becomes low level according to the inverse output.

The T-flip-flop 231 generates a high-level inverse output inversed from a logic level of the input terminal D by being synchronized with the next rising edge, and outputs the generated inverse output through an inverse output terminal Qb. In this case, the T-flip-flop 231 generates a low-level inverse output inversed from the logic level of the input terminal D by being synchronized with a rising edge of the inverse output of the T-flip-flop 232, and outputs the generated inverse output through the inverse output terminal Qb.

The T-flip-flop 231 generates a low-level inverse output inversed from the logic level of the input terminal D by being synchronized with the next rising edge of the clock signal CLK, and outputs the generated inverse output through the inverse output terminal Qb. In this case, the inverse output of each of the two T-flip-flops 231 and 232 become low level.

The NOR gate 233 generates a high-level output when the inverse outputs of the T-flip-flop 231 and the T-flip-flop 232 are low level.

The D-flip-flop 234 generates a reset signal RS2 that terminates a delay period according to the high-level output of the NOR gate 233. The D-flip-flop 234 is synchronized with a rising edge of the output of the NOR gate 233, input to a clock terminal and generates the reset signal RS2 by inversing the high-level of the input terminal D. The reset signal RS2 is output through the inverse output terminal Qb.

The second SR latch 240 generates a second decrease signal DS2 to decrease the switching frequency again when the reset signal RS2 becomes low level and the first decrease signal DS1 is enabled.

The second SR latch 240 includes a reset terminal R to which the reset signal RS2 is input and a set terminal S to which the first decrease signal DS1 is input, generates an enable-level second decrease signal DS2 by being synchronized at a rising edge of the first decrease signal DS1 when the reset signal RS2 is low level, and outputs the generated signal DS2 through an output terminal Q.

The logical operation unit 250 performs logical operation on the first frequency control signal FS1 and the second decrease signal DS2 to generate a second frequency control signal FS2 that decreases the switching frequency again. Since the enable level of the first frequency control signal FS1 and the enable level of the second decrease signal DS2 are high level, the logical operation unit 250 can be realized as an AND gate performing an AND logical operation.

Hereinafter, the oscillator 300 will be described with reference to FIG. 7.

Figure 7:
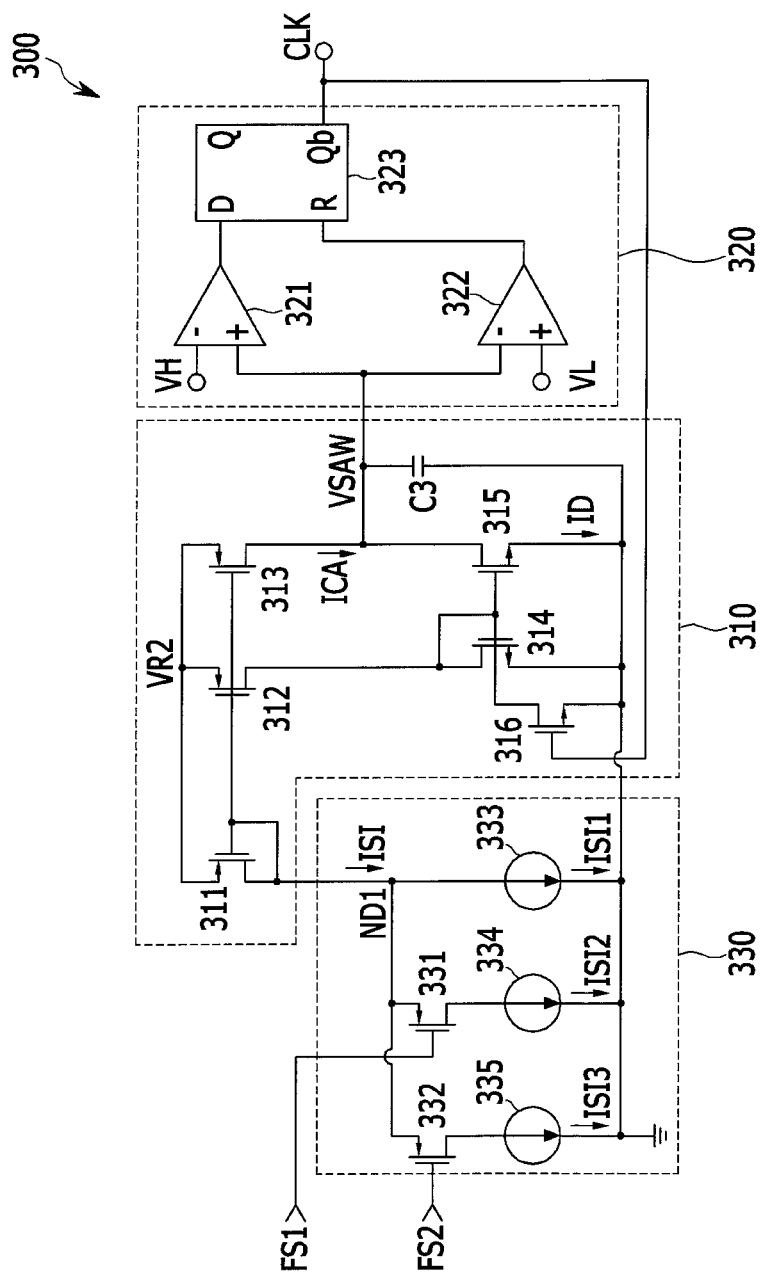
FIG. 7 shows a oscillator according to the exemplary embodiment of the present invention.

FIG. 7 shows the oscillator according to the exemplary embodiment of the present invention.

The oscillator 300 controls a frequency of the clock signal in generation of the clock signal CLK according to the first frequency control signal FS1 and the second frequency control signal FS2. The oscillator 300 decreases the frequency of the clock signal CLK according to the first frequency control signal FS1 and decreases the frequency of the clock signal CLK again according to the second frequency control signal FS2.

The oscillator 300 includes a sawtooth wave generator 310, a clock signal generator 320, and a variable synch current source 330.

The variable synch current source 330 generates a variable synch current ISI that varies according to the first and the second frequency control signals FS1 and FS2. The variable synch current source 330 according to the exemplary embodiment decreases the variable synch current ISI according to the first frequency control signal FS1, and then decreases the variable synch current ISI again according to the second frequency control signal FS2.

The variable synch current source 330 includes a first control switch 331, a second control switch 332, a first synch current source 333, a second synch current source 334, and a third synch current source 335. The variable synch current source 330 is connected with the sawtooth wave generator 310 in a node ND, and connected to the ground.

The first control switch 331 includes a gate electrode to which the first frequency control signal FS1 is input, a source electrode connected to the node ND, and a drain electrode connected to the second synch current source 334.

The second control switch 332 includes a gate electrode to which the second frequency control signal FS2 is input, a source electrode connected to the node ND, and a drain electrode connected to third synch current source 335.

The first synch current source 333 is connected between the node ND and the ground, and generates a first synch current ISI1. The second synch current source 334 is connected between the first control switch 331 and the ground, and generates a second synch current 1S12. The third synch current source 335 is connected between the second control switch 332 and the ground, and generates a third synch current ISI3.

When both of the first control switch 331 and the second control switch 332 are in the turn-on state, the variable synch current ISI equals the sum of the first to third synch currents ISI1 to 1S13.

When the first control switch 331 is turned off according to the high-level first frequency control signal FS1, the variable synch current ISI equals the sum of the first and third synch currents ISI1 and 1S13.

When the second control signal 332 is turned off according to the high-level second frequency control signal FS2 after the first control switch 331 is turned off, the variable synch current ISI is the first synch current ISI1.

That is, the variable synch current ISI is decreased to the sum (ISI1+ISI3) of the first and third synch currents ISI1 and 1S13 from the sum (ISI1+ISI2+ISI3) of the first to third synch currents ISI1 to ISI3 according to the first frequency control signal FS1, and the first synch current ISI1 is decreased according to the second frequency control signal FS2.

The sawtooth wave generator 310 generates a charging current and a discharging current by mirroring the variable synch current, and generates a sawtooth wave VSAW by controlling the charging current and the discharging current according to the clock signal CLK. The sawtooth wave generator 310 includes transistors 311, 312, 313, 314, and 315, a control transistor 316, and a capacitor C3 forming a current mirror circuit.

The transistors 311, 312, and 313 are p channel type transistors, and the transistors 314 and 315 are n channel type transistors.

A gate electrode and a drain electrode of the transistor 311 are diode-connected, and a source electrode of the transistor 311 is connected to a voltage VR2. Gate electrodes of the transistor 312 and the transistor 313 are connected to the gate electrode of the transistor 311, and source electrodes of the transistor 312 and the transistor 313 are connected to the voltage VR2.

The variable synch current ISI flows through the diode-connected transistor 311 and the variable synch current ISI is mirrored through the transistor 312 and the transistor 313.

The mirrored variable synch current ISI flowing through the transistor 313 is a charging current ICA charging the capacitor C3. A first current mirror circuit including the transistor 311 and the transistor 313 is formed to generate the charging current ICA.

The variable synch current ISI mirrored by the transistor 312 is transmitted to the transistor 314. A gate electrode and a drain electrode of the transistor 314 are diode-connected, and a source electrode of the transistor 314 is connected to the ground. A gate electrode of the transistor 315 is connected to the gate electrode of the transistor 314. While the transistor 314 and the transistor 315 are turned on, a current flowing to the transistor 314 is mirrored by the transistor 315.

Thus, the variable synch current ISI mirrored by the transistor 312 flows to the transistor 314 and the current flowing to the transistor 314 is mirrored by the transistor 315 and thus a discharging current ID is generated. The discharging current ID is generated through mirroring of a second current mirror circuit including the transistors 314 and 315.

The control transistor 316 includes a drain electrode connected to the gate electrodes of the transistors 314 and 315, a source electrode connected to the ground, and a gate electrode to which the clock signal CLK is transmitted.

While the control transistor 316 is turned on by a low-level clock signal CLK, the transistors 314 and 315 are turned on, and while the control transistor 316 is turned on by a high-level clock signal CLK, the transistors 314 and 314 are turned off. Thus, the second current mirror circuit is turned on/off according to the clock signal CLK.

When the transistors 314 and 315 are turned on, the charging current ICA flowing to the transistor 313 does not flow to the capacitor C3 but flows to the ground due to the discharging current ID flowing to the transistor 315. In addition, charges charged in the capacitor C3 are discharged by a current of which the charging current ICA is blocked from the discharging current ID.

When the transistors 314 and 315 are turned off, the charging current ICA flowing to the transistor 313 charges the capacitor C3.

That is, the sawtooth wave VSAW is increased with a slope corresponding to the charging current ICA during the turn-off period of the transistors 314 and 315, and the sawtooth wave VSAW is decreased with a slope corresponding to a current obtained by subtracting the charging current ICA from the discharging current ID during the turn-on period of the transistors 314 and 315.

The charging current ICA and the discharging current ID are generated by mirroring the variable synch current ISI, and therefore the charging current ICA and the discharging current ID are decreased as the variable synch current ISI is decreased. Then, time for charging the capacitor C3 to the highest reference VH of the sawtooth wave VSAW and time for discharging the capacitor C3 to the lowest reference VL of the sawtooth wave VSAW are increased such that the frequency of the sawtooth wave VSAW is decreased.

The clock signal generator 320 generates the clock signal CLK according to a comparison result between the highest reference VH and the lowest reference VL of the sawtooth wave VSAW.

The clock signal generator 320 includes a highest value comparator 321, a lowest value comparator 322, and an SR latch 323. The highest value comparator 321 and the lowest value comparator 322 compare an input of an inversion terminal (−) and an input of a non-inversion terminal (+). The highest value comparator 321 and the lowest value comparator 322 output high-level signals when the input of the non-inversion terminal (+) is greater than or equal to the input of the inversion terminal (−), and outputs low-level signals when the input of the non-inversion terminal (+) is less than the input of the inversion terminal (−).

The highest reference VH is input to the inversion terminal (−) of the highest value comparator 321 and the sawtooth wave VSAW is input to the non-inversion terminal (+) of the highest value comparator 321. The sawtooth wave VSAW is input to the inversion terminal (−) of the lowest value comparator 322 and the lowest reference VL is input to the non-inversion terminal (+) of the lowest value comparator 322.

The SR latch 323 decreases the clock signal CLK according to the output of the highest value comparator 321, input to the set terminal S, and increases the clock signal CLK according to the output of the lowest value comparator 322, input to the reset terminal R. The SR latch 323 outputs the clock signal CLK through the inverse output terminal Qb.

Hereinafter, operation through which the switching frequency is changed and thus the minimum duty is decreased according to the exemplary embodiment of the present invention will be described with reference to FIG. 8.

Figure 8:
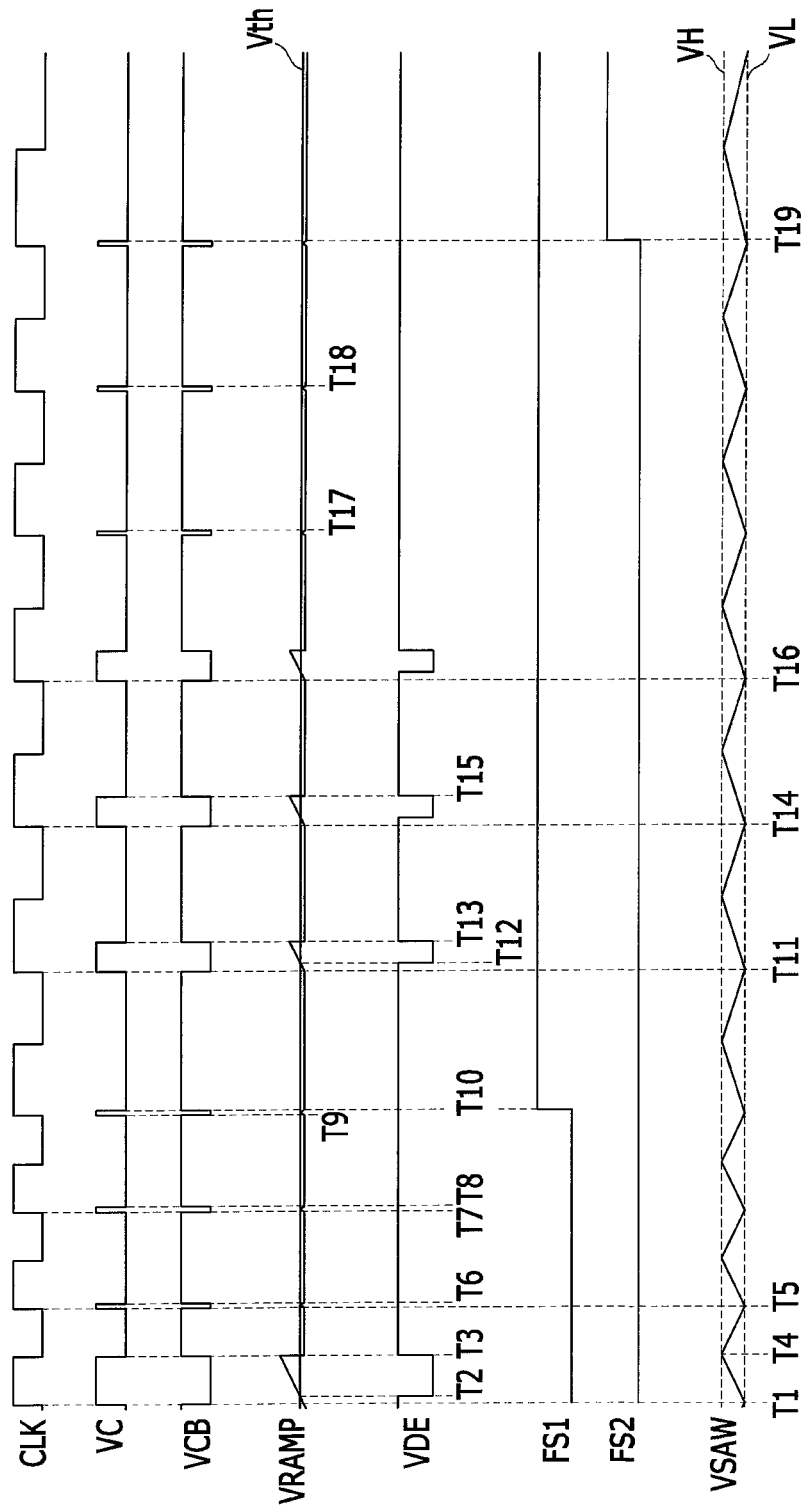
FIG. 8 is a waveform of a clock signal, a gate control signal, a ramp signal, a threshold voltage, a detection signal, a first frequency control signal, a second frequency control signal, and a sawtooth wave.

FIG. 8 is a waveform diagram of the clock signal, the gate control signal, the ramp voltage, the threshold voltage, the detection signal, the first frequency control signal, and the second frequency control signal, and the sawtooth wave according to the exemplary embodiment of the present invention.

At a time point T1, the gate control signal VC becomes high level by being synchronized with a rising edge of the clock signal CLK. Then, the power switch M is turned on, and the transistor 104 is turned off by the low-level inverse gate control signal VCB and thus the ramp voltage VRAMP begins to increase. When the ramp voltage VRAMP reaches the threshold voltage Vth at a time point T2, the detection signal VDE becomes low level.

At a time point T3, the sense voltage VS reaches the off reference voltage VRF, the comparison signal Cs becomes high level, and the SR latch 510 generates the low-level gate control signal VC. The inverse gate control signal VCB is increased to high level at the time point T3, and the transistor 104 is turned on at the time point T3 and thus the ramp voltage VRAMP is decreased to the ground and the detection signal VDE becomes high level.

By being synchronized with the rising edge of the time point T3, the D-flip-flop 211 outputs a low-level output signal Q1 through the output terminal Q and outputs a high-level output signal Q1 through the inverse output terminal Qb. A delay exists between the rising edge time point T3 of the inverse gate control signal VCB and the time point that the detection signal VDE becomes high level.

Thus, at the time point T3 that the D-flip-flop 211 is being triggered, a low-level detection signal VDE is input to the input terminal D. Then, at the time point T3, the D-flip-flop 211 generates the low-level output signal Q1 and the high-level inverse output signal Qb1.

When the sawtooth wave VSAW reaches the highest reference VH at a time point T4, the inverse output of the SR flip-flop 323 becomes high level so that the control transistor 316 is turned on and the capacitor C3 begins discharging such that the sawtooth VSAW is decreased. At a time point T5 that the decreasing sawtooth reaches the lowest reference VL, the clock signal CLK is increased and thus the gate control signal VC is increased to high level and the ramp voltage VRAMP starts to increase.

Then, the power switch M is turned on at the time point T5 and the sense voltage VS reaches the off reference voltage VRF at a time point T6 so that the gate control signal VC is decreased to low level and the inverse gate control signal VCB is increased to high level at the time point T6.

At the time point T6, the ramp voltage VRAMP is lower than the threshold voltage Vth. That is, an on-time T5 to T6 that is shorter than the minimum on-time is generated. Thus, the detection signal VDE maintains high level. At the time point T6, the D-flipflop 211 is synchronized with the rising edge of the inverse gate control signal VCB, and thus the D-flipflop 211 outputs a high-level output signal Q1 through the output terminal Q and outputs a low-level output signal Qb1 through the inverse output terminal Qb.

At a time point T7, the clock signal CLK is increased, the gate control signal VC is increased to high level, and the inverse gate control signal VCB is decreased to low level. At the time point T7, the power switch M is turned on and the ramp voltage VRAMP starts to increase.

At a time point T8, the gate control signal VC is decreased to low level and the inverse gate control signal VCB is increased to high level.

At the time point T8, the ramp voltage VRAMP is lower than the threshold voltage Vth. Thus, the detection signal VDE maintains high level. At the time point T8, the D-flip-flop 211 is synchronized with the rising edge of the inverse gate control signal VCB and thus maintains the high-level output signal Q1 and the low-level output signal Qb1. At the time point T8, the high-level output signal Q1 is input to the input terminal D of the D-flip-flop 212.

Thus, at the time point T8, the D-flip-flop 212 is synchronized with the rising edge of the inverse gate control signal VCB and thus outputs a high-level output signal Q2 through the output terminal Q and outputs a low-level output signal Qb2 through the inverse output terminal Qb.

At a time point T9, the clock signal CLK is increased, the gate control signal VC is increased to high level, and the inverse gate control signal VCB is decreased to low level. At the time point T9, the power switch M is turned on and the ramp voltage VRAMP starts to increase.

At a time point T10, the gate control signal VC is decreased to low level and the inverse gate control signal VCB is increased to high level.

At the time point T10, the ramp voltage VRAMP is lower than the threshold voltage Vth. Thus, the detection signal VDE is maintained in the high level state. At the time point T8, the D-flip-flop 211 and the D-flip-flop 212 are synchronized with the rising edge of the inverse gate control signal VCB and thus maintain the high-level output signals Q1 and Q2 and the low-level inverse output signals Qb1 and Qb2. At a time point T10, the high-level output signal Q2 is input to the input terminal D of the D-flip-flop 213.

Thus, at the time point T10, the D-flip-flop 213 is synchronized with the rising edge of the inverse gate control signal VCB and thus outputs a low-level output signal Qb3 through the inverse output terminal Qb.

Then, at the time point T10, all the inputs of the logical operation unit 214 become low-level and thus a first decrease signal DS1 becomes high level and the first frequency control signal FS1 becomes high level. The first control switch 331 is turned off, and the variable synch current ISI is decreased to the sum (ISI1+ISI3) of the synch currents ISM and ISI3. Thus, the charging current ICA and the discharging current ID are decreased according to the decrease of the variable synch current ISI.

The charging current ICA is decreased and thus the increase slope of the sawtooth wave VSAW after the time point T10 is decreased, and the discharging current ID is decreased and thus the decrease slope of the sawtooth wave VSAW after the time point T10 is decreased. Accordingly, the switching frequency is decreased, and the minimum duty is decreased due to the decrease of the switching frequency after the time point T10.

The switch controller 30 according to the present exemplary embodiment sets a threshold period rather than directly decreasing the switching frequency when the on-time is shorter than or equal to the minimum on-time to thereby decrease the switching frequency when the one-time is shorter than the minimum on-time during the corresponding threshold period.

The threshold period according to the exemplary embodiment is set to three cycles of the clock signal CLK, but the present invention is not limited thereto. In the following description, it is assumed that normal operation is performed after the time point T10 due to the decrease of the switching frequency. Since the high-level first frequency control signal FS1 is input to the reset terminals Rb of the T-flip-flops 231 and 232, the T-flip-flop 231 and 232 starts operation from the time point T10.

The capacitor C3 is discharged due to the decreased discharging current ID and thus the sawtooth wave VSAW reaches the lowest reference VL at a time point T11. Then, the clock signal CLK is increased, the gate control signal VC is increased to high level, and the inverse gate control signal VCB is decreased to low level. At the time point T11, the ramp voltage VRAMP starts to increase and the power switch M is turned on.

The high-level output of the inverse output terminal Rb is input to the input terminal D of the T-flip-flop 231 until the time point T11. When a rising edge of the clock signal CLK is generated at the time point T11, the T-flip-flop 231 is synchronized with the rising edge of the clock signal CLK and thus outputs a low-level signal through the inverse output terminal Qb.

At a time point T12, the ramp voltage VRAMP reaches the threshold voltage Vth and thus the detection signal VDE becomes low level. At a time point T13, the inverse gate control signal VCB is increased to high level, and the D-flip-flop 211 generates a high-level inverse output signal Qb1 according to the low-level detection signal VDE. Since a high-level input is generated among inputs of the logical operation unit 214, the first decrease signal DS1 becomes low level at the time point T13.

At a time point T14, the clock signal CLK is increased, the gate control signal VC is increased to high level, and the inverse gate control signal VCB is decreased to low level.

Until the time point T14, the high-level output of the inverse output terminal Rb is input to the input terminal D of the T-flip-flop 232. At the time point T14, a low-level output of the inverse output terminal Qb is input to the input terminal D of the T-flip-flop 231.

When the rising edge of the clock signal CLK is generated at the time point T14, the T-flip-flop 231 is synchronized with the rising edge of the clock signal CLK and thus outputs a high-level signal through the inverse output terminal Qb. The T-flip-flop 232 is synchronized with a rising edge of the output of the inverse output terminal Qb of the T-flip-flop 231 and thus outputs a low-level signal through the inverse output terminal Qb.

At a time point T15 that the inverse gate control signal VCB increases, the detection signal VDE is low level and therefore the D-flip-flop 211 maintains a low-level output signal Q1 and a high-level inverse output signal Qb1.

When the rising edge of the clock signal CLK is generated at a time point T16, the T-flip-flop 231 is synchronized with the rising edge of the clock signal CLK and thus outputs a low-level signal through the inverse output terminal Qb. The T-flip-flop 232 maintains the low-level output of the inverse output terminal Qb.

Then, at the time point T16, the rising edge is generated in the clock terminal of the D-flip-flop 234, and the D-flip-flop 234 generates a low-level inverse output according to a high-level input VHI of the input terminal D. The D-flip-flop 234 outputs a low-level reset signal RS2 through the inverse output terminal Qb.

After the time point T16, a low-level signal is input to the reset terminal R of the SR latch 240. Until the time point T16, a high-level signal is input to the reset terminal R of the SR latch 240 and thus the SR latch 240 generates a low-level second decrease signal DS2 regardless of an input of the set terminal S.

At a time point T17, the inverse gate control signal VCB is increased to high level and the ramp voltage VRAMP is lower than the threshold voltage Vth. That is, an on-time shorter than the minimum on-time is generated again. At time points T18 and T19, the ramp voltage VRAMP is lower than the threshold voltage and the first decrease signal DS1 becomes high level again at the time point T19.

Then, at the time point T19, the rising edge is input to the set terminal S of the SR latch 240 and the second decrease signal DS2 becomes high level. The high-level second decrease signal DS2 and the high-level first frequency control signal FS1 are input to the logical operation unit 250, and the logical operation unit 250 generates a high-level second frequency control signal FS2 at the time point T19.

Operation of the switch controller 30 during the period T17 to T19 is the same as the operation of the switch controller 30 during the period T6 to T10, and therefore no further description will be provided.

At the time point T19, the second control switch 332 is turned off by the second frequency control signal FS2, and the variable synch current ISI is decreased to the first synch current ISI1. Thus, both of the charging current ICA and the discharging current ID are decreased, and the cycle of the clock signal CLK is increased and thus the switching frequency is decreased.

Figure 9:
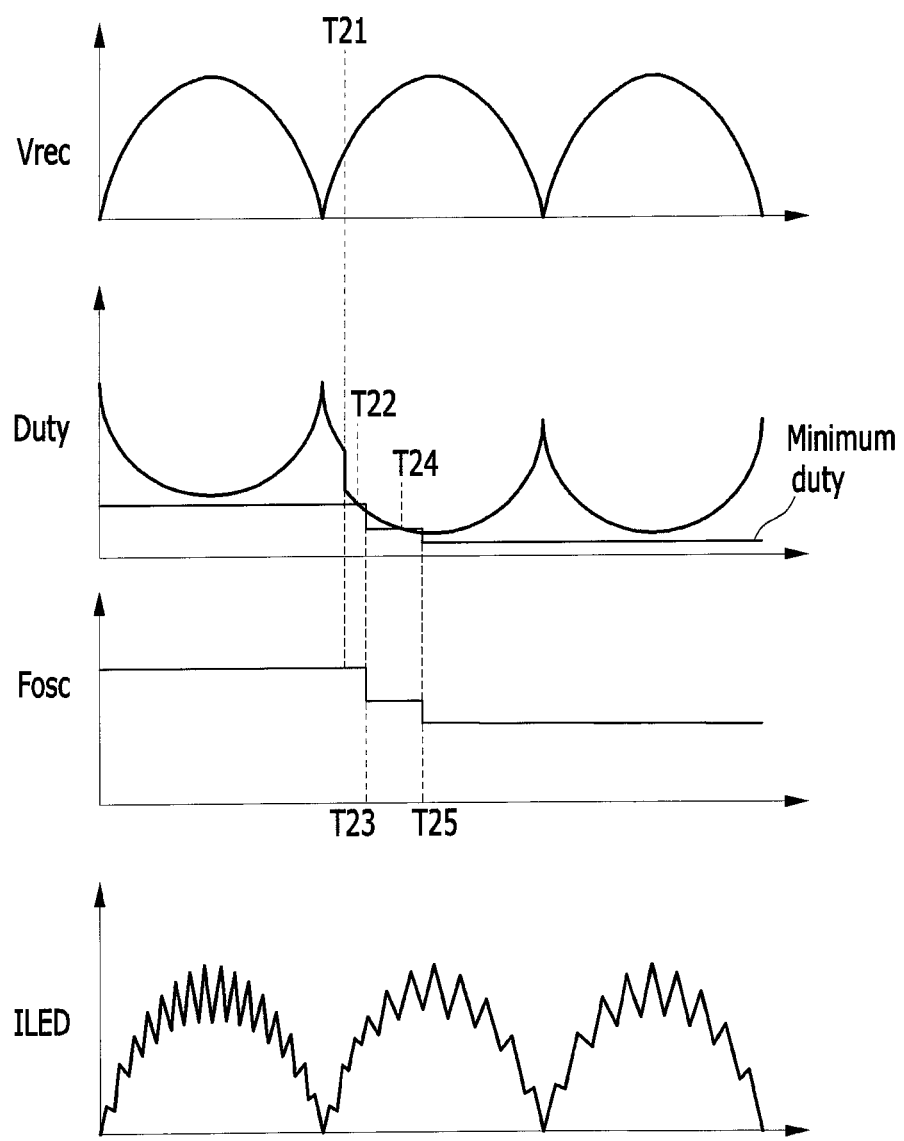
FIG. 9 shows a full-wave rectification voltage, a duty, a switching frequency, and an LED current generated according to an exemplary embodiment.

FIG. 9 shows a full-wave rectifying voltage, a duty, a switching frequency, and an LED current generated according to the exemplary embodiment. FIG. 9 schematically illustrates decrease of a switching frequency when a load of the LED string 20 is decreased according to the exemplary embodiment.

As shown in FIG. 9, when the load of the LED string 20 is decreased a time point T21, a duty is rapidly decreased. At a time point T22, the decreased duty becomes smaller than the minimum duty for three cycles of the clock signal CLK, a switching frequency Fosc is decreased at a time point T23. Accordingly, the minimum duty is decreased.

From the time point T23, a normal operation period is provided and thus an on-time is longer than the minimum on-time according to the decreased switching frequency. The duty is smaller than the minimum duty again at a time point T24, and the switching frequency is decreased again at a time point T25, that is, a time point after three cycles of the clock signal having the decreased frequency. The minimum duty is decreased again at the time point T25.

Through such an operation, the LED current ILED has a sine wave without having the current distortion of in FIG. 3.

Figure 10:
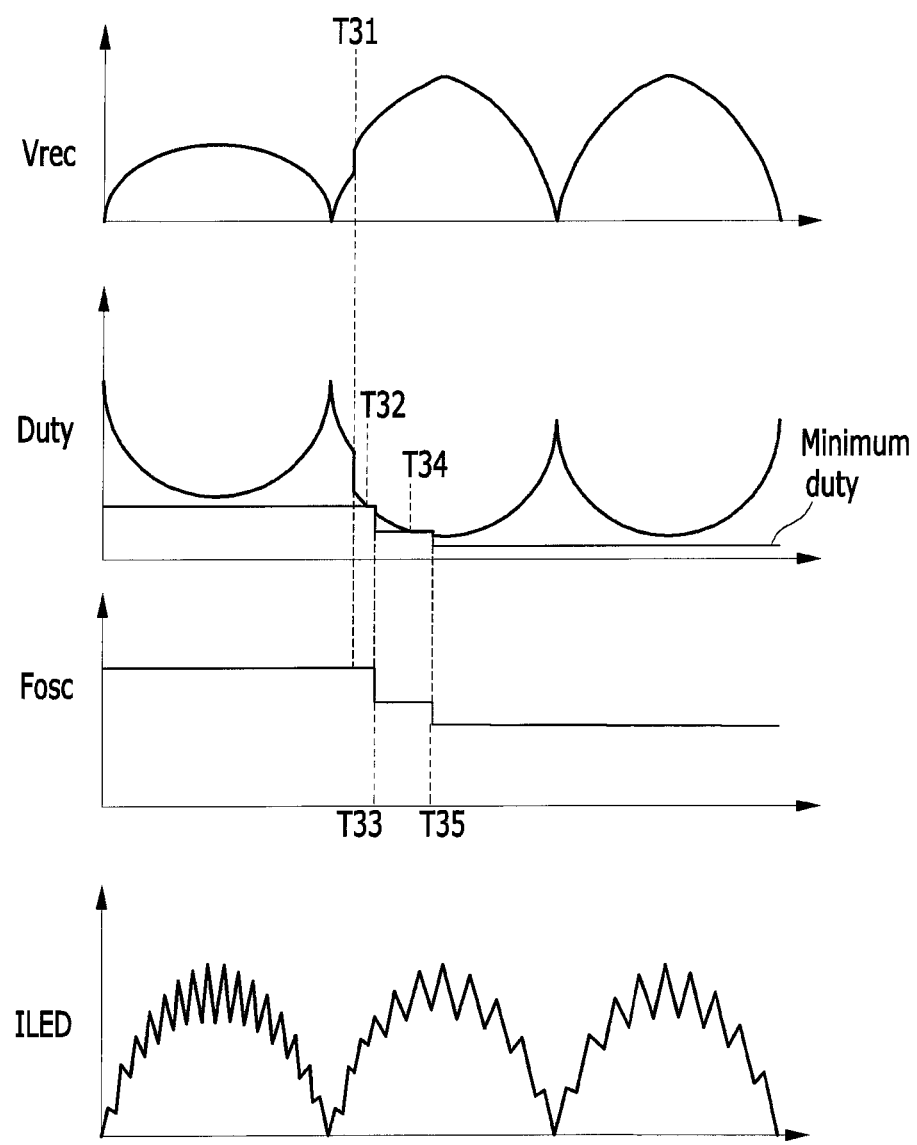
FIG. 10 shows a full-wave rectification voltage, a duty, a switching frequency, and an LED current generated according to another exemplary embodiment.

FIG. 10 shows a full-wave rectifying voltage, a duty, a switching frequency, and an LED current generated according to the exemplary embodiment. FIG. 10 schematically illustrates decrease of the switching frequency when the full-wave rectifying voltage is rapidly increased according to the exemplary embodiment of the present invention.

As shown in FIG. 10, when the full-wave rectifying voltage Vrec is rapidly increased at a time point T31, the duty is rapidly decreased. The decreased duly is lower than the minimum duty at a time point T32 for three cycles of the clock signal, the switching frequency Fosc is decreased at a time point T33. Accordingly, the minimum duty is decreased.

From the time point T33, a normal operation period is provided and thus an on-time is longer than the minimum on-time according to the decreased switching frequency. The duty is smaller than the minimum duty again at a time point T34, and the switching frequency is decreased again at a time point T35, that is, a time point after three cycles of the clock signal having the decreased frequency. The minimum duty is decreased again at the time point T35.

Through such an operation, the LED current ILED has a sine wave without having the current distortion of in FIG. 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power switch M, switch controller 30, power supply 40, inductor L
  bridge diode 10, diode (11, 12, 13, 14, 15), LED string 20
  on-time detector 100, frequency controller 200, oscillator 300
  gate driver 400, switching control unit 500, biasing unit 600
  under voltage lockout 700, capacitor C1, C2, and C3, SR latch 323 and 510, LEB 520
  switching comparator 530, inverter 101, constant current source 102, comparator 103
  switching transistor 104, counter 210, first SR latch 220, delay unit 230
  second SR latch 240, logical operation unit 214 and 250, D-flip-flop (211, 212, 213, 234)
  T-flip-flop 231 and 232, NOR gate 233, sawtooth generator 310
  clock signal generator 320, variable synch current source 330, first control switch 331
  second control switch 332, first synch current source 333, second synch current source 334
  third synch current source 335, transistor (311, 312, 313, 314, 315)
  control transistor 316, highest value comparator 321, lowest value comparator 322

What is claimed is:

1. A switch controller controlling switching operation of a power switch, comprising
  a control means detecting an on-time of the power switch and decreasing a frequency of a clock signal according to a period during which the detected on-time is shorter than or equal to the minimum on-time, and
  a switching control unit controlling switching of the power switch according to the clock signal,
  wherein the minimum on-time is an on period of the turn-on power switch and cannot be shortened.

2. The switch controller of claim 1, wherein the control means comprises:
  an on-time detector detecting the on-time using a switching control signal for switching control, generated from the switching control unit;
  a frequency controller controlling frequency decrease of a clock signal according to a period during which the detected on-time is shorter than the minimum on-time; and
  an oscillator generating the clock signal according to control of the frequency controller.

3. The switch controller of claim 2, wherein the on-time detector generates a ramp voltage corresponding to the on-time using the switching control signal and generates a detection signal according to a result of comparison between a threshold voltage corresponding to the minimum on-time and the ramp voltage.

4. The switch controller of claim 3, wherein the on-time detector comprises:
  a switching transistor performing switching according to the switching control signal;
  a capacitor including a first terminal connected to a first terminal of the switching transistor;
  a constant current source connected to the first terminal of the capacitor; and
  a comparator including a first input terminal connected to the capacitor and a second input terminal to which the threshold voltage is input, and outputting a result of comparison between the two inputs, and
  a voltage charged in the capacitor is the ramp voltage.

5. The switch controller of claim 4, wherein the on-time detector further comprises an inverter inverting the switching control signal and outputting the inverse signal, and
  an output of the inverter is input to a gate electrode of the switching transistor.

6. The switch controller of claim 3, wherein the frequency controller counts a period during which the detected on-time is shorter than or equal to the minimum on-time, and decreases the frequency of the clock signal when the counting result reaches a predetermined threshold period.

7. The switch controller of claim 6, wherein, after decreasing of the frequency of the clock signal, the frequency controller decreases the decreased frequency of the clock signal again when a counting result of the period during which the detected on-time is shorter than or equal to the minimum on-time reaches the threshold period again.

8. The switch controller of claim 7, wherein the frequency controller comprises:
  a counter counting a period during which the ramp voltage is lower than the threshold voltage by sensing the detection signal for each switching period of the power switch according to the switching control signal, and generating a first decrease signal indicating whether the counting result reaches the threshold period;
  a first SR latch generating a first frequency control signal according to the first decrease signal;
  a second SR latch generating a second decrease signal according to the first decrease signal after a predetermined delay period;
  a delay unit maintaining the second SR latch to be reset during the delay period after frequency decrease of the clock signal; and
  a first logical operation unit generating a second frequency control signal by performing a logical operation on the second decrease signal and the first frequency control signal.

9. The switch controller of claim 8, wherein the counter comprises n D-flipflops, each including an input terminal, an output terminal, an inverse output terminal, and a clock signal to which a signal corresponding to the switching control signal is input and a second logical operation unit,
  an input terminal of one of the n D-flipflops is connected to an output terminal of another D-flipflop disposed in the previous stage, an output terminal of the D-flipflop is connected to an input terminal of another D-flipflop disposed in the next stage of the D-flipflop, and the detection signal is input to an input terminal of the D-flipflop of the first stage among the n D-flip-flops, the second logical operation unit generates the first decrease signal by performing logical operation on n inverse output signals output through the respective inverse output terminals of the n D-flopflops, and n is determined according to the threshold period.

10. The switch controller of claim 9, wherein when the n D-flip-flops output n low-level inverse output signals, the first SR latch generates an enable-level first frequency control signal that decreases a frequency of the clock signal according to the first decrease signal.

11. The switch controller of claim 10, wherein the second logical operation unit is an NOR gate and the signal corresponding to the switching control signal is an inverse signal of the switching control signal.

12. The switch controller of claim 8, wherein the delay unit comprises m T-flipflops, each including a reset terminal to which the first frequency control signal, a clock signal, an input terminal, and an inverse output terminal connected to the input terminal, a third logical operation unit, and an D-flip-flop, an inverse output terminal of one T-flipflop among the m T-flip-flops is connected to a clock terminal of another T-flipflop disposed in the next stage, and the clock signal is input to a clock terminal of the T-flipflop of the first terminal among the m T-flip-flops, the third logical operation performs logical operation on m inverse output signals output through the respective inverse output terminals of the m T-flip-flops, the D-flip-flop generates a reset signal that terminates the delay period according to an output of the third logical operation unit, and m is determined according to the delay period.

13. The switch controller of claim 12, wherein, when the m T-flip-flops output m low-level inverse output signals, the D-flipflop generates the reset signal.

14. The switch controller of claim 13, wherein the third logical operation unit is an NOR gate, an output of the third logical operation unit is input to the clock terminal of the D-flipflop, a high-level signal is input to the input terminal of the D-flipflip, and the reset signal is an inverse output of the D-flip-flop.

15. The switch controller of claim 8, wherein the oscillator control the frequency of the clock signal in generation of the clock signal according to the first and second frequency control signals.

16. The switch controller of claim 15, wherein the oscillator comprises:

a variable synch current source generating a variable synch current that varies according to the first and second frequency control signals;

a sawtooth wave generator generating a charging current and a discharging current by mirroring the variable synch current and generating a sawtooth wave by controlling the charging and discharging currents according to the clock signal; and a clock signal generator generating the clock signal according to a result of comparison between sawtooth wave and highest and lowest references.

17. The switch controller of claim 16, wherein the variable synch current comprises:

a first synch current source connected with the sawtooth wave generator at a node;

a first control switch including a first terminal connected to the node, and being switched according to the first frequency control signal;

a second control switch including a first terminal connected to the node, and being switched according to a second frequency control signal;

a second synch current source connected to a second terminal of the first control switch; and a third synch current source connected to a second terminal of the second control switch.

18. The switch controller of claim 16, wherein the sawtooth wave generator comprises:

a first current mirror circuit generating the charging current by mirroring the variable synch current;

a second current mirror circuit being turned on/off according to the clock signal and generating the discharging current by mirroring the mirrored variable synch current; and a capacitor charged by the charging current and discharged by a difference between the discharging current and the charging current.

19. The switch controller of claim 18, wherein the first current mirror circuit comprises a first transistor through which the variable synch current flows and being diode-connected and a second transistor including a gate electrode connected to a gate electrode of the first transistor, the second current mirror circuit comprises a third transistor through which the mirrored variable synch current flows and being diode-connected and a fourth transistor including a gate electrode connected to a gate electrode of the third transistor and a first electrode connected to a first electrode of the second transistor, the sawtooth wave generator further comprises a first electrode connected to gate electrodes of the third and fourth transistors, a gate electrode to which the clock signal is input, and a second electrode being grounded, and the capacitor is connected between a node at which the second transistor and the fourth transistor are connected with each other and the ground.

20. The switch controller of claim 16, wherein the clock signal generator comprises:

a highest value comparator receiving the sawtooth wave and the highest reference and generating an output according to a result of comparison between the two inputs;

a lowest value comparator receiving the sawtooth wave and the lowest reference and generating an output according to a result of comparison between the two inputs; and an SR latch decreasing the clock signal according to the output of the highest value comparator and increasing the clock signal according to the output of the lowest value comparator.

21. A method for controlling switching operation of a power switch, comprising:

detecting an on-time of the power switch; and decreasing a switching frequency of the power switch according to a period during which the detected on-time is shorter than or equal to the minimum on-time, wherein the minimum on-time is an on period of the power switch and cannot be shortened.

22. The method of claim 21, wherein the detecting of the on-time comprises generating a ramp voltage corresponding to the on-time using a switching control signal generated in the controlling of the switching and detecting the on-time according to a result of comparison between a threshold voltage corresponding to the minimum on-time and the ramp voltage.

23. The method of claim 22, wherein the decreasing of the switching frequency comprises decreasing a frequency of a clock signal in generation of the clock signal according to a period during which the detected on-time is shorter than or equal to the minimum on-time, and the switching frequency of the power switch depends on the frequency of the clock signal.

24. The method of claim 23, wherein the decreasing of the frequency of the clock signal in generation of the clock signal comprises:
   a first decrease step in which the period during which the detected on-time is shorter than or equal to the minimum on-time and the frequency of the clock signal is decreased when the counting result reaches a predetermined threshold period; and
   a second decrease step in which when a counting result of a period during which the detected on-time is shorter than or equal to the minimum on-time reaches the threshold period again after decreasing of the frequency of the clock signal, the decreased frequency of the clock signal is decreased again.

25. The method of claim 24, wherein the decreasing of the frequency of the clock signal in generation of the clock signal further comprising blocking decreasing the frequency of the clock signal again for a predetermined delay period after decreasing of the frequency of the clock signal.

26. A power supply comprising:
   an inductor to which a full-wave rectifying voltage is input and a current depending on the full-wave rectifying voltage flows;
   a power switch connected to the inductor to control the inductor current; and
   a switch controller detecting an on-time of the power switch and decreasing a switching frequency of the power switch according to a period during which the detected on-time is shorter than or equal to the minimum on-time,
   wherein the minimum on-time is an on period of the power switch and cannot be shortened.

27. The power supply of claim 26, wherein the switch controller comprises:
   an on-time detector detecting the on-time using a switching control signal controlling switching operation of the power switch;
   a frequency controller controlling frequency decrease of a clock signal according to a period during which the detected on-time is shorter than or equal to the minimum on-time; and
   an oscillator generating the clock signal according to control of the frequency controller.

28. The power supply of claim 27, wherein the on-time detector generates a ramp voltage corresponding to the on-time using the switching control signal and generates a detection signal according to a result of comparison between a threshold voltage corresponding to the minimum on-time and the ramp voltage.

29. The power supply of claim 28, wherein the frequency controller counts a period during which the detected on-time is shorter than or equal to the minimum on-time, generates a first frequency control signal decreasing a frequency of the clock signal when the counting result reaches a predetermined threshold period, and generates a second frequency control signal decreasing the decreased frequency of the clock signal again when a result of counting a period during which the detected on-time is shorter than or equal to the minimum on-time again after decreasing the frequency of the clock signal reaches the threshold period again.

30. The power supply of claim 29, wherein the frequency controller prevents the frequency of the clock signal from being decreased again during a predetermined delay period after the frequency decrease of the clock signal.

31. The power supply of claim 30, wherein the oscillator generates a variable synch current that varies according to the first and second frequency control signals, generates a charging current and a discharging current by mirroring the variable synch current, generating a sawtooth wave by controlling the charging and discharging currents according to the clock signal, and generating the clock signal according to a result of comparison between the sawtooth wave and highest and lowest references.

* * * * *